United States Patent [19]

Yoshimura et al.

[11] Patent Number: 5,010,990
[45] Date of Patent: Apr. 30, 1991

[54] SLIP CONTROL SYSTEM FOR LOCKUP TORQUE CONVERTER

[75] Inventors: Hiroshi Yoshimura; Takuji Fujiwara; Kozo Ishi; Kazuo Takemoto, all of Hiroshima, Japan

[73] Assignee: Mazda Motor Corporation, Hiroshima, Japan

[21] Appl. No.: 432,214

[22] Filed: Nov. 6, 1989

[30] Foreign Application Priority Data

Nov. 4, 1988 [JP] Japan ............................. 63-278608
Aug. 17, 1989 [JP] Japan ............................. 1-211972

[51] Int. Cl.⁵ ..................... F16H 61/14; F16H 45/02
[52] U.S. Cl. ................................. 192/3.3; 192/3.31; 192/103 C; 74/890; 475/65
[58] Field of Search ............... 192/0.076, 3.3, 3.31, 192/103 C; 74/890; 475/65

[56] References Cited

U.S. PATENT DOCUMENTS

| | | | |
|---|---|---|---|
| 4,570,770 | 2/1986 | Nishikawa et al. | 192/3.31 X |
| 4,577,737 | 3/1986 | Niikura et al. | 192/3.3 X |
| 4,640,394 | 2/1987 | Higashi et al. | 192/3.31 X |
| 4,720,003 | 1/1988 | Murasugi | 192/0.076 |
| 4,940,122 | 7/1990 | Fujieda | 192/3.31 |
| 4,957,194 | 9/1990 | Sawa et al. | 192/3.3 X |

FOREIGN PATENT DOCUMENTS

| | | | |
|---|---|---|---|
| 60-256675 | 12/1985 | Japan | 192/3.3 |
| 62-124355 | 6/1987 | Japan | 192/3.3 |
| 62-127566 | 6/1987 | Japan | 192/3.3 |

Primary Examiner—Richard Lorence
Attorney, Agent, or Firm—Fleit, Jacobson, Cohn, Price, Holman & Stern

[57] ABSTRACT

A lockup torque converter of an automatic transmission for an automotive vehicle consists of an impeller connected to an engine, a turbine connected to the automatic transmission, and a lockup clutch disposed between first and second pressure chambers formed in a housing of said lockup torque converter for locking and releasing the lockup torque converter. A control unit supplies a hydraulic pressure into the first pressure chamber and withdraw a hydraulic pressure chamber from the second pressure chamber or reversely so as to actuate the lockup clutch to lock or unlock the lockup torque converter, respectively. A pressure regulating unit develops a pressure difference between the first and second pressure chambers when the shifting of the automatic transmission is detected, thereby causing the lockup clutch to allow the lockup torque converter to slip in accordance with certain conditions.

23 Claims, 10 Drawing Sheets

SLIP CONTROL SYSTEM FOR LOCKUP TORQUE CONVERTER

FIELD OF THE INVENTION

The present invention relates to a lockup torque converter control system, and more particularly to a slip control system for a lockup torque converter of an automatic transmission for an automotive vehicle.

BACKGROUND OF THE INVENTION

A torque converter incorporated in an automatic transmission for an automotive vehicle allows some slippages, even at cruising speeds. This is due to the fact that the only connection between pump and turbine is the transmission fluid. To prevent this slipping action, and thus improve fuel economy, a number of torque converters are equipped with a lockup feature. When a lockup unit or clutch is activated, the pump or impeller and turbine are mechanically locked together. To allow a lockup condition, most setups are arranged so that the transmission must be in high range and in a cruise condition. In a low range of vehicle speeds where the lockup torque converter is generally apt to transmit changes in engine output torque to wheels of the automotive vehicle and therefore, the automotive vehicle is uncomfortable to ride in, the lockup clutch is released so as to unlock the lockup torque converter, thereby operating as a ordinary torque converter which can multiply engine torque and absorb changes in engine output torque. On the other hand, in a high range of vehicle speeds where changes or fluctuations in engine output torque are not significant, the lockup torque converter is locked so as to prevent its slippage action and improve fuel economy.

In addition to the transmission of changes or fluctuations in engine output torque to the wheels, one of other problems is presented by increased engine torque transmission losses caused by the lockup torque converter in the low range of vehicle speeds where the lockup clutch is released so as to unlock the lockup torque converter. Another problem encountered in the lockup torque converter is that torque transmitted to the wheels changes considerably when the automatic transmission shifts while the torque converter is still locked. As a result, shocks are possibly encountered in the automotive vehicle upon the automatic transmission shifts itself. On the other hand, in addition to such shocks, the automotive vehicle is possibly subjected to a relatively large shock upon the lockup torque converter is locked immediately after the shifting of the transmission.

To eliminate these shocks, the lockup torque converter is controlled by a slip control system in such a way as to allow some slippages between the impeller and turbine when the automotive vehicle operates within a definite range of engine load and/or vehicle running speed conditions or when the automatic transmission is shifted, thereby decreasing torque losses so as to suppress or prevent vibrations of the automotive vehicle or shocks upon the automatic transmission shifts itself. To adapt the lockup torque converter to allow some slippages, the slip control system develops a predetermined working pressure to be applied to the lockup clutch so regulated as to produce a desired speed difference of rotation between the impeller and turbine. Such a slip control system is known from, for example, Japanese Unexamined Patent Publication Nos. 60(1985)-116929 and 60(1985)-14653.

In the slip control system described in the above mentioned publications, the regulated working pressure is constant, regardless of whether or not the automotive engine is slowing down such that the automatic transmission shifts itself.

Meanwhile, when the automatic transmission shifts, in particular downshifts into low range, the automotive engine should perform different operations in accordance with whether or not the engine is slowing down. In almost all of modern automotive engines, fuel cut-off in which the delivery of fuel to the engine is interrupted is effected when the automotive engine is slowing down while operating at speeds of rotation higher than a predetermined speed of rotation of, for example, approximately 1000rpm and released when the automotive engine reaches speeds of rotation lower than the predetermined speed of rotation. Accordingly, there are two somewhat conflicting requirements to such engines that govern fuel economy and the ability of acceleration. That is, when the automatic transmission downshifts into low range while the automotive engine slows down or decelerates, it is required not only to increase the effect of engine braking but also to prolong a time period for which the fuel cut-off is continued by suppressing the drop of the speed of rotation of the automotive engine for fuel economy and, on the other hand, when the automatic transmission downshifts into low range although the automotive engine is not in deceleration, it is required that the automotive engine rapidly increases its speed of rotation for desired acceleration. However, there is no slip control system that applies different working pressures to the lockup torque converter in accordance with engine operating conditions when the automatic transmission shifts, in particular downshifts into low range.

SUMMARY OF THE INVENTION

The primary object of the present invention is to provide a lockup torque converter slip control system in which working pressure to be applied to a lockup clutch is regulated differently in accordance with engine operating conditions when an automatic transmission shifts itself between particular ranges.

The object of the present invention is achieved by providing a slip control system for controlling a lockup torque converter of an automatic transmission for an automotive vehicle having an engine which comprises a torque input element operatively connected to the engine, a torque output element operatively connected to the automatic transmission, and a lockup clutch disposed between first and second pressure chambers formed in a housing of the lockup torque converter for locking and releasing the lockup torque converter. An hydraulic pressure supply system for supplying a hydraulic pressure to the lockup torque converter so as to actuate the lockup clutch to lock the lockup torque converter includes a hydraulic pressure control means disposed therein which varies the hydraulic pressure between when the engine is in decelerating conditions and when it is not in any deceleration condition, both in a condition where the automatic transmission shifts itself, in particular downshifts into low range, whereby allowing the lockup torque converter to slip differently.

To vary the hydraulic pressure, the hydraulic pressure control means consists of a hydraulic pressure regulating solenoid valve which operates at different duty ratios.

BRIEF DESCRIPTION OF THE DRAWINGS

Still other objects of the invention and more specific features will become apparent to those skilled in the art from the following description of the preferred embodiment considered together with the accompanying drawings in which;

FIG. 1 a flow chart illustrating an ordinary slip control subroutine for the microcomputer;

DESCRIPTION OF THE PREFERRED EMBODIMENT

Because automatic transmissions with lockup torque converters are well known, the present description will be directed in particular to elements forming parts of, or cooperating directly with, a lockup torque converter with a slip control system in accordance with the present invention. It is to be understood that elements not specifically shown or described can take various forms well known to those skilled in the automatic transmission art.

Figure 1:
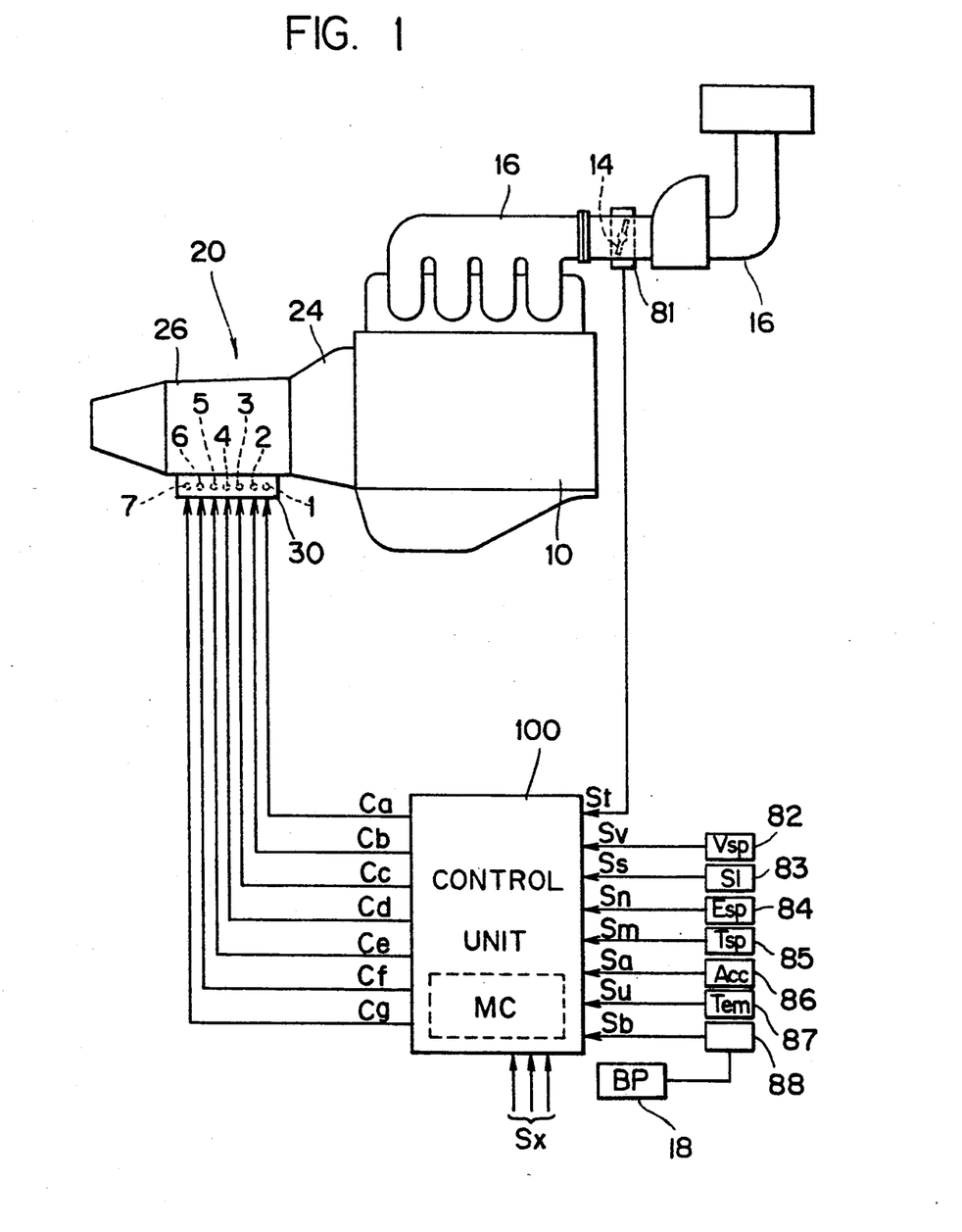
FIG. 1 is a schematic view showing an automotive vehicle power plant controlled by hydraulic control circuit provided with a slip control system in accordance with a preferred embodiment of invention.
Figure 2:
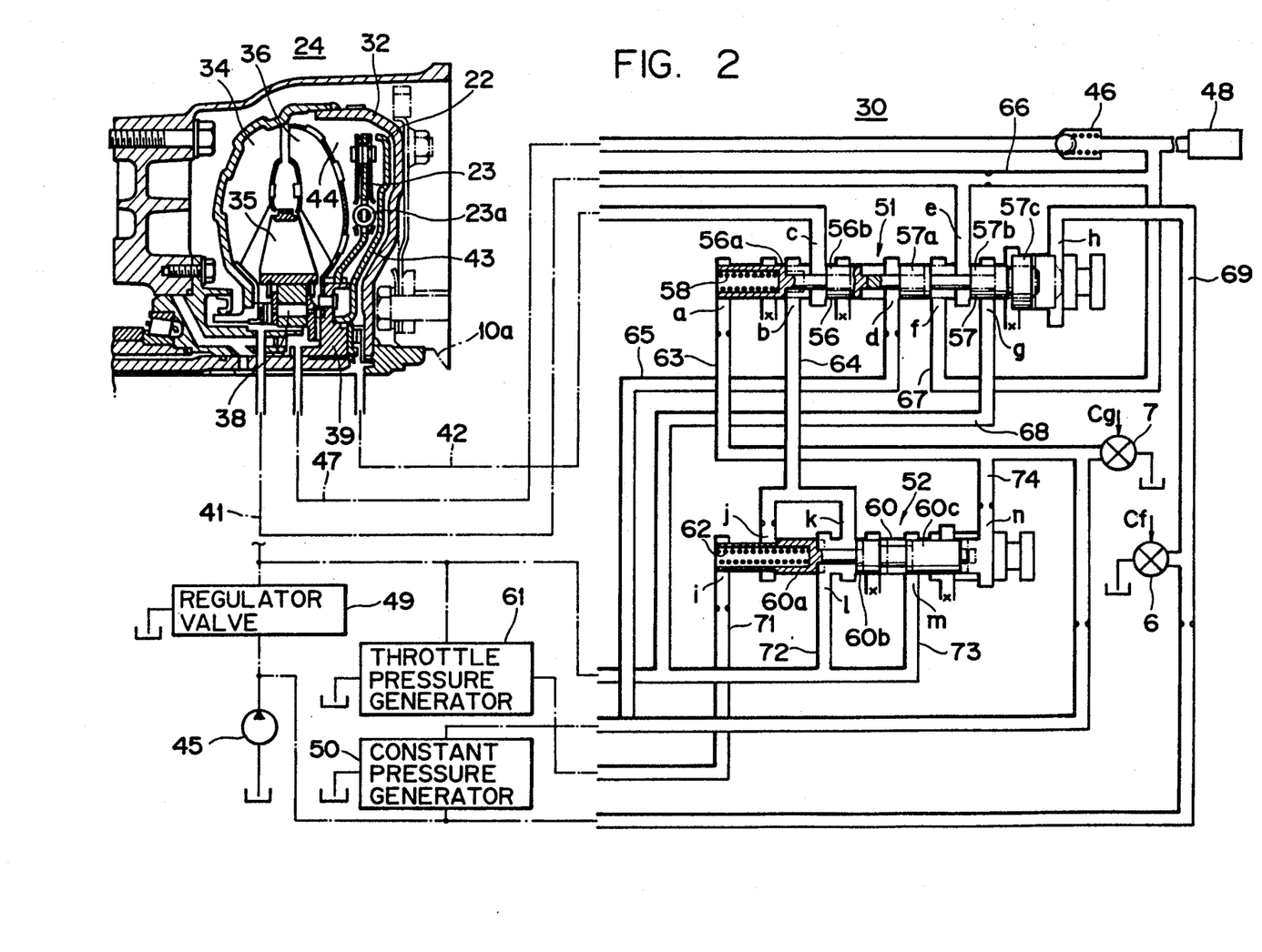
FIG. 2 a hydraulic control circuit for controlling the power plant shown in FIG. 1.

Referring to the drawings in detail, particularly to FIGS. 1 and 2, a power plant 1 of an automotive vehicle in cooperation with a slip control system for a lockup torque converter in accordance with the present invention is shown, comprising an engine 10 and an automatic transmission 20 having a transmission gear 26 and a lockup torque converter 24. The engine 10 is formed with a plurality of, for example four, cylinders arranged in series. Intake air is introduced into the respective cylinders through an intake manifold 16a connected to an intake pipe 16 in which a throttle valve 14 is disposed. A mixture of gasoline and air is drawn into the engine 10 for its fuel by the vacuum formed during the intake stroke, and then compressed, fired and exhausted. This cycle is repeated over and over in each cylinder. Output torque from the engine 10 is transmitted to wheels of the automotive vehicle through a power train including the automatic transmission 20. It is to be noted that the delivery of fuel to the engine 10 is interrupted when the throttle valve 14 is fully closed to decelerate the engine 10 operating at speeds of rotation higher than a predetermined speed of rotation and recovered when the engine 10 reaches speeds of rotation lower that the predetermined speed of rotation.

The automatic transmission 20 consisting of the lockup torque converter 24 and the transmission gear 26 is controlled by a hydraulic control circuit 30 including various control valves, such as shift control solenoid valves 1-5, a lockup control solenoid valve 6 and a pressure regulating solenoid valve 7.

The lockup torque converter 24, as shown in detail in FIG. 2, consists of a driving plate or driving wheel 32 driven by an engine output member or engine output shaft 10a, such as an engine crankshaft of the engine 10, a driving torus or impeller 34 integrally connected to the driving wheel 32, a driven torus or turbine 36 to which engine output is transmitted from the impeller 34 by means of a special lightweight oil when the impeller 34 turns, a stator 35 disposed between the impeller 34 and the turbine 36 and an one way clutch 38 disposed between the stator 35 and stationary part of a housing of the lockup torque converter 24. The lockup torque converter is provided with a lockup clutch 22 and a torsion damper 23 disposed between the driving wheel 32 and the turbine 36 and spline coupled to a hub 39 of the turbine 36. The lockup clutch 22 and the torsion damper 23 are connected to each other by means of a coil spring 23a. The lockup clutch 22 can move as one whole close to and away from the driving wheel 32 and is rotatable together with the turbine 36.

The lockup clutch 22 disposed in a space between the driving wheel 32 and the turbine 36 divides the space into two pressure chambers, namely a back pressure chamber 43 and an inner pressure chamber 44. Hydraulic pressure forces the lockup clutch 22 to move away from the driving wheel 32 when introduced into the back pressure chamber 43 by the hydraulic control circuit 30 through an oil passage 42, or to move close the driving wheel 32 when introduced into the inner pressure chamber 44 through an oil passage 41. The lockup clutch 22 is brought into frictional connection to the driving wheel 32 when a hydraulic pressure developed in the inner pressure chamber 44 becomes higher than a predetermined hydraulic pressure developed in the back pressure chamber 43, thereby coupling the impeller 34 and turbine 36 of the lockup torque converter 24 together so as to lockup the lockup torque converter 24. On the other hand, the lockup clutch 22 is disconnected or released from the driving wheel 32 when a hydraulic pressure developed in the front pressure chamber 44 becomes lower than a predetermined hydraulic pressure in the back pressure chamber 43, thereby operatively disconnecting the impeller 34 and the turbine 36 from each other so as to unlock the lockup torque converter 24. As far as the difference of pressure between the hydraulic pressures in the back pressure chamber 43 and the inner pressure chamber 44 is within a definite range of pressures, the lockup torque converter 24 allows some slippages or relative rotations between the impeller 34 and the turbine 36. The higher the difference of pressure is developed, the larger the frictional coupling force between the lockup clutch 22 and the driving wheel 32 becomes. As shown in FIG. 2, the front pressure chamber 44 is connected to an oil cooler 48 by way of an oil passage 47 with a check valve 46 disposed therein.

The hydraulic control circuit 30 is further provided with a lockup shift valve 51 and a lockup pressure regulating valve 52 in addition to the shift control solenoid valves 1-5, the lockup control solenoid valve 6 and the regulating solenoid valve 7. The lockup shift valve 51 has a first spool 56 formed with lands 56a and 56b, and a second spool formed with lands 57a and 57b having pressure receiving areas equal to those of the lands 56a and 56b and a land 57c having a pressure receiving area larger than any one of the lands 56a, 56b, 57a and 57b. The first and second spools 56 and 57 are shifted in an axial direction thereof so as to open and close ports a to h and three drain ports x formed therein. The first spool is urged toward the second spool 57 by a coil spring 58. The lockup pressure regulating valve 52 having a spool 60 formed with lands 60a 60b and 60c is urged in an axial direction thereof which is the same direction as that in which the first spool 56 is urged by a coil spring 62. The spool 60 is shifted in the axial direction so as to open and close ports i to n and two drain ports x formed therein.

The lockup shift valve 51 is connected to; an oil pump 45 by way of three oil passages, an oil passage 63 with the pressure regulating solenoid valve 7 disposed therein through a constant pressure generator 50 at the port a, an oil passage 65 through the constant pressure generator 50 at the port d, and an oil passage 69 with the lockup control solenoid valve 6 disposed therein at the port h; the ports j and k of the lockup pressure regulating valve 52 by way of an oil passage 64 at the port b; the back pressure chamber 43 of the lockup torque converter 24 by way of an oil passage 42 at the port c; the oil cooler 48 by way of oil passages 66 and 67 at the ports e and f, respectively; and a regulating valve 49 by way of an oil passage 68 at the port g. The lockup pressure regulating valve 52 is connected to; an throttle pressure generator 61 by way of an oil passage 71 at the port i; the regulating valve 49 by way of oil passages 72 and 73 at the ports l and m, respectively; and part of the oil passage 63 downstream the pressure regulating solenoid valve 7 by way of an oil passage 74 at the port n. The throttle pressure generator 61 is connected to the regulating valve 49; both of the regulating valve 49 and the constant pressure generator 50 are connected to the oil pump 45. The oil passages 63, 65, 66, 69, 71 and 74 are provided with orifices at appropriate locations, respectively. It is noted that the smaller the opening of the throttle valve 14 becomes, the lower the hydraulic pressure generated by the throttle pressure generator 61 is.

The transmission gear 26 is of a planetary type which provides with a choice of four forward speeds and provided with friction coupling members of such as a clutch and a brake. The hydraulic control circuit 30 provides regulated hydraulic pressures for actuating and deactuating these friction coupling members so as to cause the transmission gear 26 to shift itself into various ranges: parking range (P range), reverse range (R range), neutral range (N range), drive range (D range) including four forward speed ranges, second range (2 range) and low range (1 range).

A control unit 100, which provides the valves 1-7 of the hydraulic control circuit 30 with control signals Ca, Cb, Cc, Cd, Ce, Cf and Cg, respectively to actuate them, is connected to outputs St, Sv, Ss, Sn, Sm, Sa, Su, Sb of a throttle opening sensor 81, a vehicle speed sensor 82, a transmission shift lever position sensor 83, an engine speed sensor 84, a turbine speed sensor 85, an accelerator sensor 86 for detecting the degree of depression of an accelerator pedal, an oil temperature sensor 87 for detecting the temperature of the working oil applied to the automatic transmission 20, and a brake sensor 88 for detecting the degree of depression of a brake pedal 18. Because these sensors 81-88 are well known in operation and structure to those skilled in the art, they need not be described in detail herein. The control unit 100 further receives various control signals Sx necessary to control operations of the engine 10 and the automatic transmission 20 with the lockup torque converter 24.

Figure 3:
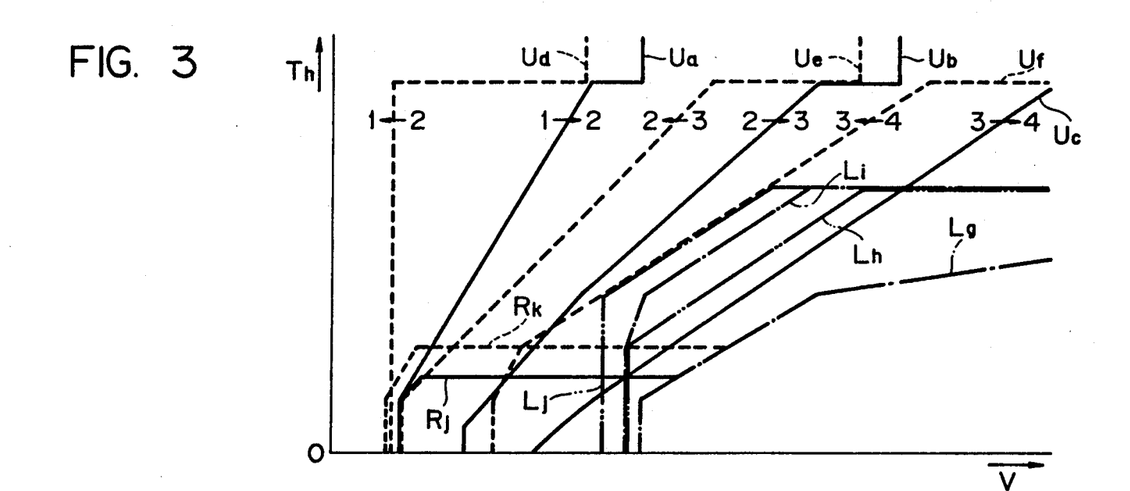
FIGS. 3 to 8 are control maps to determine control factors used in controlling a lockup torque converter of a automatic transmission of the power plant shown in FIG. 1.

For controlling the automatic transmission 20 and the lockup torque converter 24 with the lockup clutch 22, the control unit 100 has a self-contained memory in which data of a control map for shift control of the automatic transmission 20 and lockup control of the lockup clutch 22 is stored. FIG. 3 illustrates, by way of example, a control map which includes automatic transmission shift control lines Ua-Uf, lockup control lines Lg and Li, unlock control lines Lh and Hj, a slip control lines Rj and a slip control interrupt line Rk. In more detail, the shift control lines Ua, Ub and Uc are used to decide whether or not a throttle opening (Th) of the throttle valve 14 and a speed (V) of the automotive vehicle are in a definite range of conditions where the automatic transmission 29 upshifts itself into higher range; into second from first (1-2), into third from second (2-3), or into fourth from third (3-4), respectively. Similarly, the shift control lines Ud, Ue and Uf are used to decide whether or not a throttle opening (Th) of the throttle valve 14 and a speed of the automotive vehicle are in a definite range of conditions where the automatic transmission 20 downshifts itself into lower range; first from second (2-1), second from third (3-2), and third from fourth (4-3), respectively. The lockup control lines Lg and Li are used to decide whether or not the automotive vehicle operates in a definite range of lockup conditions for a third and a fourth range of the automatic transmission 20, respectively, where the lockup clutch 22 locks the lockup torque converter 24; the unlock control lines Lh and Lj are used to decide whether or not the automotive vehicle operates in a definite range of lockup conditions for a third and a fourth range of the automatic transmission 20, respectively, where the lockup clutch 22 unlocks or releases the lockup torque converter 24. The slip control line Rj and slip control interrupt line Rk are used to initiate and terminate slippages of the lockup clutch 22, respectively.

The control unit 100 is adapted to provide the shift control solenoid valves 1-5 with control signals Ca-Ce, respectively, when detecting the automotive vehicle operating in the range of upshifting conditions or downshifting conditions, thereby selectively actuating the shift control solenoid valves 1-5 so as to cause the automatic transmission 20 to shift itself into desired ranges.

The control unit 100 is also adapted to interrupt the control signals Cf and Cg to the lockup control solenoid valve 6 and the pressure regulating solenoid valve 7, respectively, when the automotive vehicle is neither in the definite range of lockup conditions nor in the definite range of slip control conditions (which will be described later), thereby shutting down both the lockup control solenoid valve 6 and the pressure regulating solenoid valve 7. As a result, the lockup shift valve 51 is supplied at the port h thereof with a hydraulic pressure from the oil pump 45 through the oil passage 69, without any pressure drop and at the port a thereof with a constant hydraulic pressure regulated by the constant pressure generator 50 through the oil passage 63 and, simultaneously, the lockup pressure regulating solenoid valve 52 is supplied at the port n thereof with the constant hydraulic pressure regulated by the constant pressure generator 50 through the oil passage 74. These hydraulic pressures cause the lockup shift valve 51 to shift its first and second spools 56 and 57 to first or one of their two extreme positions shown by full line in FIG. 2 against the coil spring 58 by virtue of the land 57c of the second spool 57 of the lockup shift valve 51 having a pressure receiving area larger than that of any other land 57a, 57b, 57a and 57c of the first and second spools 56 and 57 and the lockup pressure regulating valve 52 to shift the spool 60 of the lockup pressure regulating valve 52 to first or one of its two extreme positions shown by full line in FIG. 2 against the coil spring 62, due to the constant hydraulic pressure at the port n of the lockup pressure regulating valve 52 higher than that at the port i from the throttle pressure generator 61. Accordingly, the lockup shift valve 51 communicates its ports b and c with each other and the lockup pressure regulating valve 52 communicates its ports k and 1 with each other, so that a hydraulic pressure regulated by the regulating valve 49 is applied to the back pressure chamber 43 of the lockup torque converter 24 through the oil passages 72, 64 and 42. Simultaneously, the lockup shift valve 51 communicates its ports e and f, so as to carry away or withdraw the oil from the inner pressure chamber 44 to the oil cooler 48 through oil passages 41 and 67. In this way, the lockup clutch 22 is released from the driving wheel 32, thereby unlocking the lockup torque converter 24 so as to operate as an ordinary torque converter which transmits engine torque with fluid.

When detecting the automotive vehicle operates in the definite range of lockup conditions, the control unit 100, on one hand, provides the lockup control solenoid valve 6 with a control signal Cf and, on the other hand, interrupts a control signal Cg to the pressure regulating solenoid valve 7, thereby opening the lockup control solenoid valve 6 and shutting down a pressure regulating solenoid valve 7 so as to drop the hydraulic pressure applied to the lockup shift valve 51 at the port h and applies a hydraulic pressure regulated by the constant pressure generator 50 to both of the lockup shift valve 51 at the port a and the lockup pressure regulating valve 52 at the port n. As a result, the lockup shift valve 51 forces the first and second spools 56 and 57 to shift to their other or second extreme positions shown by a dotted line in FIG. 2 by the coil spring 58 and the lockup pressure regulating valve 52 forces the spool 60 to shift to its other or second extreme position shown by a dotted line in FIG. 2 by the coil spring 62. Accordingly, the lockup shift valve 51 communicates its ports b and with each other and the lockup pressure regulating valve 52 communicates its ports k and l with each other, so as to carry away the oil from the back pressure chamber 43 to an oil pan (not shown) through the drain port x opened by the land 56b of the first spool 56 and the oil passage 42. Simultaneously, the lockup shift valve 51 communicates its ports g and e, so that a hydraulic pressure regulated by the regulating valve 49 is applied to the inner pressure chamber 44 of the lockup torque converter 24 through the oil passages 68 and 41. In this way, the lockup clutch 22 moves against the driving wheel 32, thereby the lockup torque converter 24 is locked so as to operate as a solid drive unit with no slippage between the turbine 33 and the impeller 34.

In the case that an operating condition defined by throttle opening (Th) and vehicle speed (V) of the automotive vehicle is in the range between the slip control line Rj and the slip control interrupt line Rk shown in FIG. 3, when the automotive vehicle operates in the definite range of ordinary slip conditions wherein the temperature of the working oil is in a definite range of degrees and no lockup condition is developed; when the automotive vehicle operates in the definite range of shift slip control conditions wherein an upshifting condition is developed; or when the automotive vehicle operates in a definite range of deceleration slip control conditions wherein the throttle valve 14 is fully closed to decelerate the engine while the engine 10 operates at speeds of rotation higher than a predetermined speed of rotation; the control unit 100 provides the lockup control solenoid valve 6 with a control signal Cf, so as to cause the lockup clutch 22 to lockup the lockup torque converter 24 and the pressure regulating solenoid valve 7 with a control signal Cg having duty ratios of, for example, more than 20%, so that the the lockup clutch 22 allows some slippages with respect to the driving wheel 32.

In the above slip control conditions wherein the lockup clutch 22 allows some slippages against the driving wheel 32, the lockup shift valve 51 shifts the first spool 56 thereof to its first extreme position and the second spool 57 to its second extreme position by the aid of a hydraulic pressure applied thereto at the port d via the oil passage 65 through the constant pressure generator 50 and from the oil pump 45; the lockup pressure regulating valve 52 shifts the spool 60 away from the first extreme position by a distance corresponding to the difference between hydraulic pressures received at the ports i and n thereof, respectively, which becomes lower as the duty ratio of control signal Cg becomes higher, thereby variably decreasing an effective open area of the port 1 of the lockup pressure regulating valve 52. Accordingly, although the inner pressure chamber 44 receives a hydraulic pressure as regulated by the regulating valve 49 through the oil passage 68, the back pressure chamber 43 receives a hydraulic pressure which is regulated by the regulating valve 49 and then evacuated by the lockup pressure regulating valve 52 in accordance with the duty ratio of control signal Cg, so that the lockup clutch 22 is pressed against the driving wheel 32 by virtue of the pressure difference $\Delta P$ between the hydraulic pressures developed in the back and inner pressure chambers 43 and 44. This causes the lockup torque converter 24 to produce a speed difference of rotation $\Delta N$ between the impeller 34 and turbine 36 according to the pressure difference $\Delta P$, thereby causing the lockup torque converter 24 to allow a slippage. Letting herein Pt, Pd and Fa be a throttle pressure applied to the lockup pressure regulating valve 52 at the port i, a duty control pressure applied to the lockup pressure regulating valve 52 at the port n and a tension force of the spring 62 of the lockup pressure regulating valve 52, respectively, and $C_1$ and $C_2$ be constants, the pressure difference $\Delta P$ is formularized as follows:

$$\Delta P = C_1(Pt - Pd) + Fa/C_2$$

Figure 4:
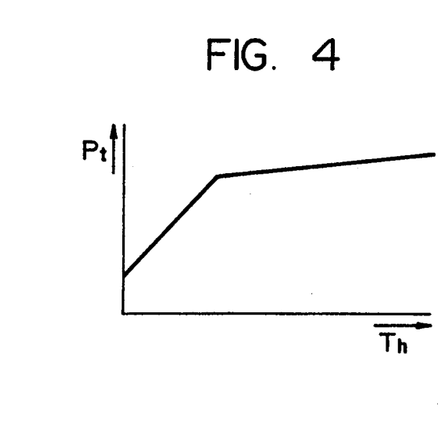
Figure 5:
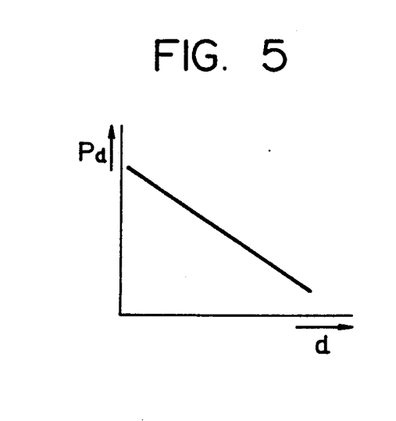
Figure 6:
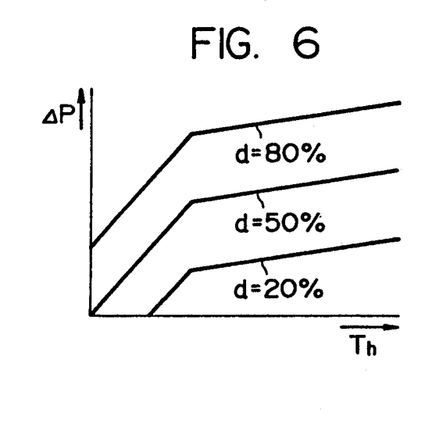

From the above formula, it is apparent that the pressure difference $\Delta P$ is determined depending upon throttle pressure Pt and duty control pressure Pd. These throttle pressure Tt and duty control pressure Pd are developed depending upon throttle openings of the throttle valve 14 and duty ratios of the control signal Cg as shown in FIGS. 4 and 5, respectively. Accordingly, as shown by curves for three different duty ratios of, for example, 20%, 50% and 80% of control signal Cg in FIG. 6, the larger the throttle opening (Th) of the throttle valve 14 becomes, the higher the pressure difference ΔP is.

A maximum torque transmissible to the turbine 36 from the impeller 34 through the lockup clutch 22 frictionally connected to the driving wheel 32 thereby to lockup the lockup torque converter 24, which is hereinafter referred to as a transmissible torque Ts, is formularized as follows:

$$Ts = \Delta P \times \mu \times r \times A$$

where
μ is a coefficient of friction of the lockup clutch 22;
r is an effective radius of the lockup clutch 22; and
A is a contact area between the lockup clutch 22 and the driving wheel 32.

Figure 7:
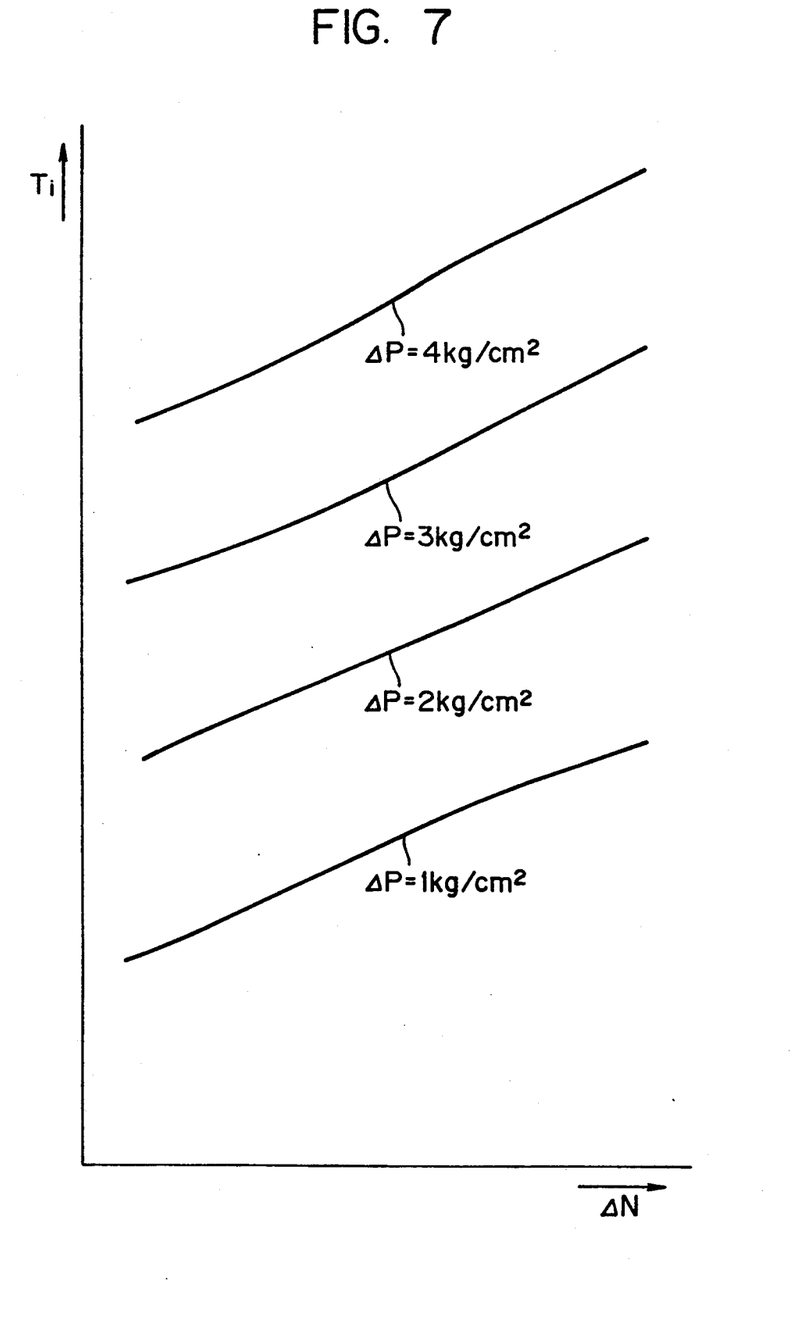

It is apparent from the above formula that the transmissible torque Ts is proportional to the pressure difference ΔP and, when an input torque Ti to the lockup torque converter 24 which is generally equivalent to an engine output torque Te transmitted to the driving wheel 32 is higher than the transmissible torque Ts, the speed difference of rotation ΔN must be caused between the impeller 34 and the turbine 36. The speed difference ΔN, as shown by lines for four different pressure differences fo 1Kg/cm, 2Kg/cm, 3Kg/cm and 4Kg/cm at a temperature of 90° C. in FIG. 7, becomes larger as the input torque Ti to the torque converter 24 becomes large.

Figure 8:
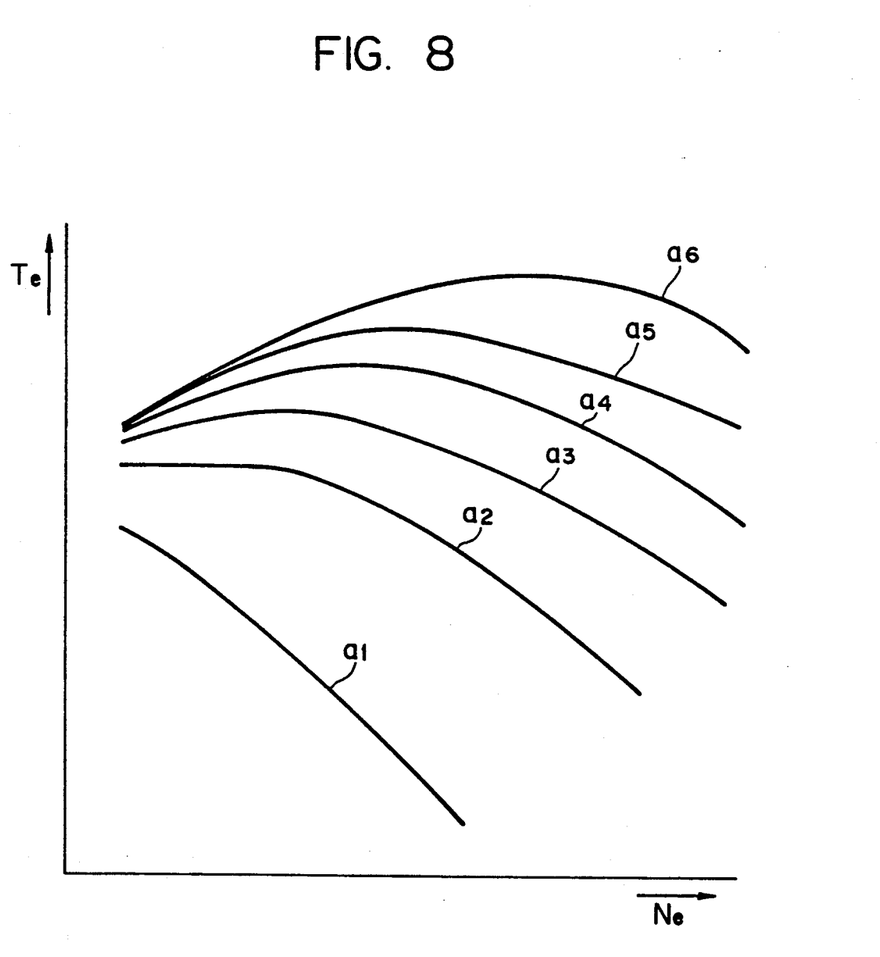

From the fact as described above, to control slippages caused in the lockup clutch 22 of the lockup torque converter 24, the engine output torque Te is determined first based on a throttle opening (Th) of the throttle valve 14 and an engine speed of rotation (Ne) of the engine 10 when the automotive vehicle operates not in the definite range of shift slip control conditions but in the definite range of ordinary slip control conditions. It is noted that engine output torques Te are previously established in accordance with combinations of throttle openings of the throttle valve 14 and engine speeds of rotation of the engine 10. For example, as shown in FIG. 8, the engine output torque Te is drawn from engine output torque curves a1 to a6 prepared for, for example, six different throttle openings of ⅛, 2/8, ⅜, 4/8, ⅝ and 6/8 of the full throttle opening of the throttle valve 14, respectively, in accordance with engine speeds of rotation Ne of the engine 10. Data of engine output torques Te thus obtained is memorized as a control map data in the self-contained memory of the control unit 100. To set an engine output torque Te, the control unit 100 reads out data of an engine output torque Te defined by an operating throttle opening of the throttle valve 14 and an operating engine speed of rotation of the engine 10 which are in the definite range of ordinary slip control conditions.

A transmissive torque Tr is set by multiplying the engine output torque Te thus set by a correction coefficient K which takes a value of one (1) at an oil temperature of 90° C., a value larger than one (1) at oil temperatures higher than 90° C., or a value smaller than one (1) at oil temperatures lower than 90° C. Then, the pressure difference ΔP, which is set so sufficient as to produce a desired speed difference of rotation ΔN of, for example, 80r.p.m. between the impeller 34 and the turbine 36 in order to sufficiently decrease an energy loss in the lockup torque converter 24 and damp fluctuations of engine output torque, is drawn from the map of relationships among input torques Ti, speed differences ΔN and pressure difference ΔP shown in FIG. 7. It is noted that the speed difference of rotation ΔN is suitably variable according to engine operating and vehicle running conditions.

The duty ratio d of control signal Cg necessary to produce the desired pressure difference ΔP is drawn from the map of relationships between pressure difference ΔP and duty ratio d. The control unit 100 generates a control signal Cg having an appropriate duty ratio d thus established and sends it to the pressure regulating solenoid valve 7 so as to effect the ordinary slip control of the lockup torque converter 24.

Upon setting a duty ratio d as an actual duty ratio, if the difference ΔY between a duty ratio d read out from the map and a duty d having been previously set is too large and the duty d read out is set as an actual duty ratio, the pressure difference ΔY the pressure difference ΔP becomes large so as thereby to possibly cause vehicle vibrations. In an attempt at avoiding the occurrence of such vehicle vibrations, if the difference of duty ratio ΔY exceeds predetermined upper or lower limit value, a duty ratio d is set by adding the upper limit value to the duty ratio d having been set or by subtracting the lower limit value from the duty ratio d having been set.

In the definite range of ordinary slip control conditions, because of the pressure difference ΔP determined depending upon the input torque Ti to the lockup torque converter 24, the speed difference ΔN, which is not only necessary to decrease energy losses in the lockup torque converter 24 and damp changes or fluctuations of the engine output torque but also suitable for the actual engine operating condition, is quickly produced between the impeller 34 and the turbine 36. This results in good fuel economy and suppressed vehicle vibrations.

In the case of detecting the automotive vehicle operating in the definite range of shift slip control conditions, when the lockup clutch 22 was brought into slip-allowing coupling against the driving wheel 32 immediately before the operating condition falls in the definite range of shift slip control conditions, the control unit 100 sets a duty ratio d of control signal Cg to the duty ratio having been set and sends a control signal Cg having the duty ratio d thus set to the pressure regulating solenoid valve 7 so as thereby to cause the lockup torque converter 24 to effect shift slip control. In the definite range of shift slip control conditions, on the other hand, when the lockup clutch 22 has not been brought into slipping connection against the driving wheel 32, and hence locked or released, immediately before the operating condition falls in the definite range of shift slip control conditions, the control unit 100 sets a pressure differente ΔP necessary to produce a desired speed difference of rotation ΔN between the impeller 34 and the turbine 36 based on an input torque Ti to the lockup torque converter 24 in the same manner as in the ordinary slip control and then, provides the pressure regulating solenoid valve 7 with a control signal Cg having a duty ratio d sufficient to develop the pressure difference ΔP, thereby causing the lockup torque converter 24 to effect the shift slip control until the automatic transmission 20 completely shifts itself.

The completion of shifting may be determined as a timing the speed of rotation of the turbine 36 becomes equal to an expected speed of rotation at the completion of shifting of the automatic transmission which is calculated based on the operating engine speed of rotation and a transmission gear ratio of a range to which the automatic transmission shifts.

In the shift slip control, because of the pressure difference $\Delta P$ determined depending on the input torque Ti to the torque converter 24 at the start of shift slip control, the speed difference $\Delta N$ necessary to damp fluctuations of engine output torque and suitable for engine operating conditions is quickly produced between the impeller 34 and the turbine 36. This prevents the automotive vehicle from being subjected to heavy shocks due to the shifting of the automatic transmission 20.

The control unit 100, when detecting the automotive vehicle in a definite range of downshifting conditions, interrupts control signals Cf and Cg to the lockup control solenoid valve 6 and the pressure regulating solenoid valve 7, respectively, so as thereby to release the lockup clutch 22 excepting when the engine 10 is decelerating.

The control unit 100, when detecting the automotive vehicle in a definite range of deceleration slip control conditions while out of the lockup range wherein a torque is transmitted to the engine from the wheels, reads a torque transmitted to the engine from the wheels (which is hereinafter referred to as a drag torque Te') from the self-contained memory thereof. Drag torques Te' are experimentally determined in accordance with engine speeds of rotation and previously memorized in the self-contained memory of the control unit 100. It is noted that the drag torque Te' takes a value that increases proportionally to the square of an operating speed of engine. After calculating a transmissive torque Tr' by multiplying the drag torque Te' by a correction coefficient K, a pressure difference P, which is sufficient to produce a desired speed difference of rotation $\Delta N$ between the impeller 34 and the turbine 36 in order to suppress vehicle vibrations and increase the effect of engine braking, is determined based on the transmissive torque Tr'. The control unit 100 provides the pressure regulating solenoid valve 7 with a control signal Cg having a duty ratio d sufficient in order to develop the pressure difference $\Delta P$, thereby causing the torque converter 24 to effect the deceleration slip control.

The control unit 100 causes the torque converter 24 to effect the shift slip control when detecting the automotive vehicle condition in a definite range of upshifting conditions while in the definite range of deceleration slip control conditions, or interrupts control signals Cf and Cg to the the lockup control solenoid valve 6 and the pressure regulating solenoid valve 7, respectively, when detecting the automotive vehicle in either a definite range of 3-2 downshifting conditions or a definite range of 2-1 downshifting conditions, so as thereby to keep the lockup clutch 22 released.

The control unit 100, when detecting that a brake pedal (BP) 18 is depressed down while the automotive vehicle is in the range of deceleration slip control conditions, translates the 4-3 downshifting control line Uf by shifting the vehicle speed (V) on the 4-3 downshifting control line Uf at the idle position or throttle position of zero (0) of the throttle valve 14 to a high vehicle speed side. In this state, when detecting the automotive vehicle in a range of translated 4-3 downshifting conditions, the control unit 100 causes the torque converter 24 to effect the shift slip control in the same manner as in the upshifting control range. The reason of controlling the operation of the lockup clutch 22 in different manners between the ranges of 3-2 or 2-1 downshifting conditions and the range of 4-3 downshifting conditions is that, because the speed of vehicle generally becomes significantly low when the transmission gear 26 downshifts into low range, either into second from third or into first from second, while the automotive vehicle is in the definite range of deceleration slip control conditions, the speed of engine becomes lower than a speed at which the fuel cut-off is released so as to deliver fuel to the engine and, in contrast with this, because the speed of engine becomes higher than the fuel cut-off recovery speed when the transmission gear 26 downshifts into third from fourth, the fuel cut-off is effected.

As apparent, in the deceleration slip control, because the pressure difference $\Delta P$ is determined in accordance with engine operating and vehicle running conditions, the speed difference $\Delta N$ suitable for an operating condition of the engine 10 is quickly produced between the impeller 34 and the turbine 36. This damps fluctuations of transmissive torque by the torque converter 24, whereby suppressing vehicle vibrations and contributing to the effect of engine braking.

Because, when detecting that a brake pedal (BP) 18 is depressed down while the automotive vehicle is in the definite range of deceleration slip control conditions, a time period for which the transmission gear 26 stays in the third range becomes longer due to the translation of the 4-3 downshifting control line Uf to a high vehicle speed side, the control unit 100 suppresses the drops of engine speed to prolong a time period for which the fuel cut-off is continuously effected. Moreover, because, when detecting the automotive vehicle in the definite range of the translated 4-3 downshifting control conditions, the control unit 100 operates the lockup clutch 22 to allow the torque converter 24 to slip for the shift slip control, the effect of engine braking is intensified as compared to when the lockup clutch 22 is released and the drop of engine speed is suppressed, thereby prolonging a fuel cutoff time period so as to contribute to or enhance fuel economy during the deceleration of engine.

Whereas, when the automotive vehicle condition is in the definite range of fourth to third downshifting conditions while not in the definite range of deceleration slip control conditions, the control unit 100 keeps the lockup clutch 22 released, whereby the speed of engine rapidly increases so as to contribute to or improve the acceleration performance of the automotive vehicle as compared to when the lockup clutch 22 is in slip-allowing coupling.

Owing to the fact that the lockup clutch 22 operates in different conditions between that a specific shifting operation of the transmission gear 26 is taken when the engine 10 is decelerating and that the specific shifting operation of the transmission gear 26 is taken when the engine 10 is in conditions other than deceleration, suitable operations of the lockup clutch 22 are caused for any vehicle running condition.

The operation of the engine with the torque converter with a lockup feature depicted in FIGS. 1 and 2 is best understood by reviewing FIGS. 9-12, which are flow charts illustrating various routines and subroutines for a microcomputer MC by which the control unit 100 is comprised. Programming is a skill well understood in the art. The following description is written to enable a programmer having ordinary skill in the art to prepare an appropriate program for the microcomputer. The particular details of any such program would of course depend upon the architecture of the particular computer selection.

Figure 9:
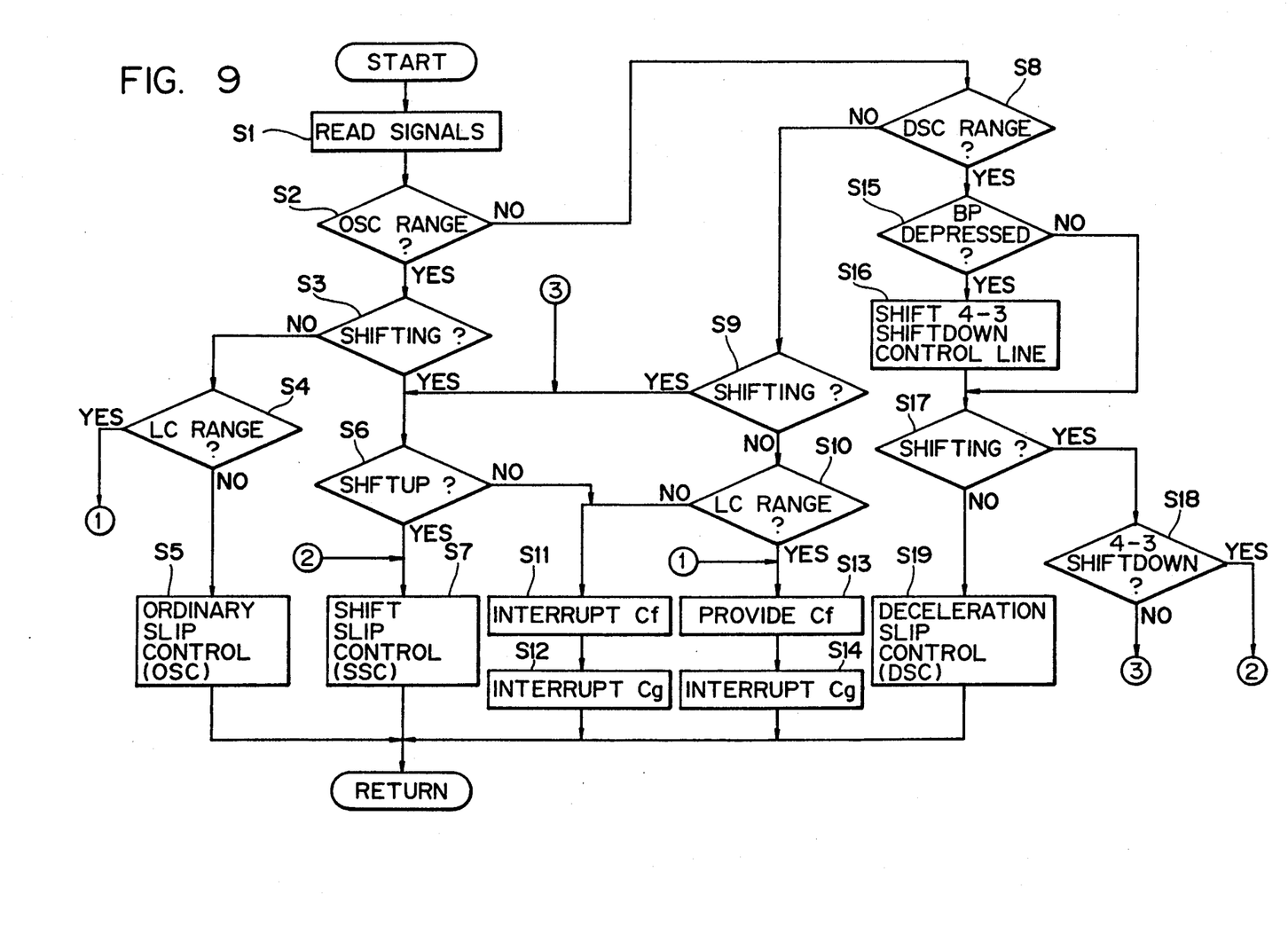
FIG. 9 is a flow chart illustrating a general sequence or main routine for a microcomputer which controls operations of automatic transmission with the lockup torque converter.
Figure 10:
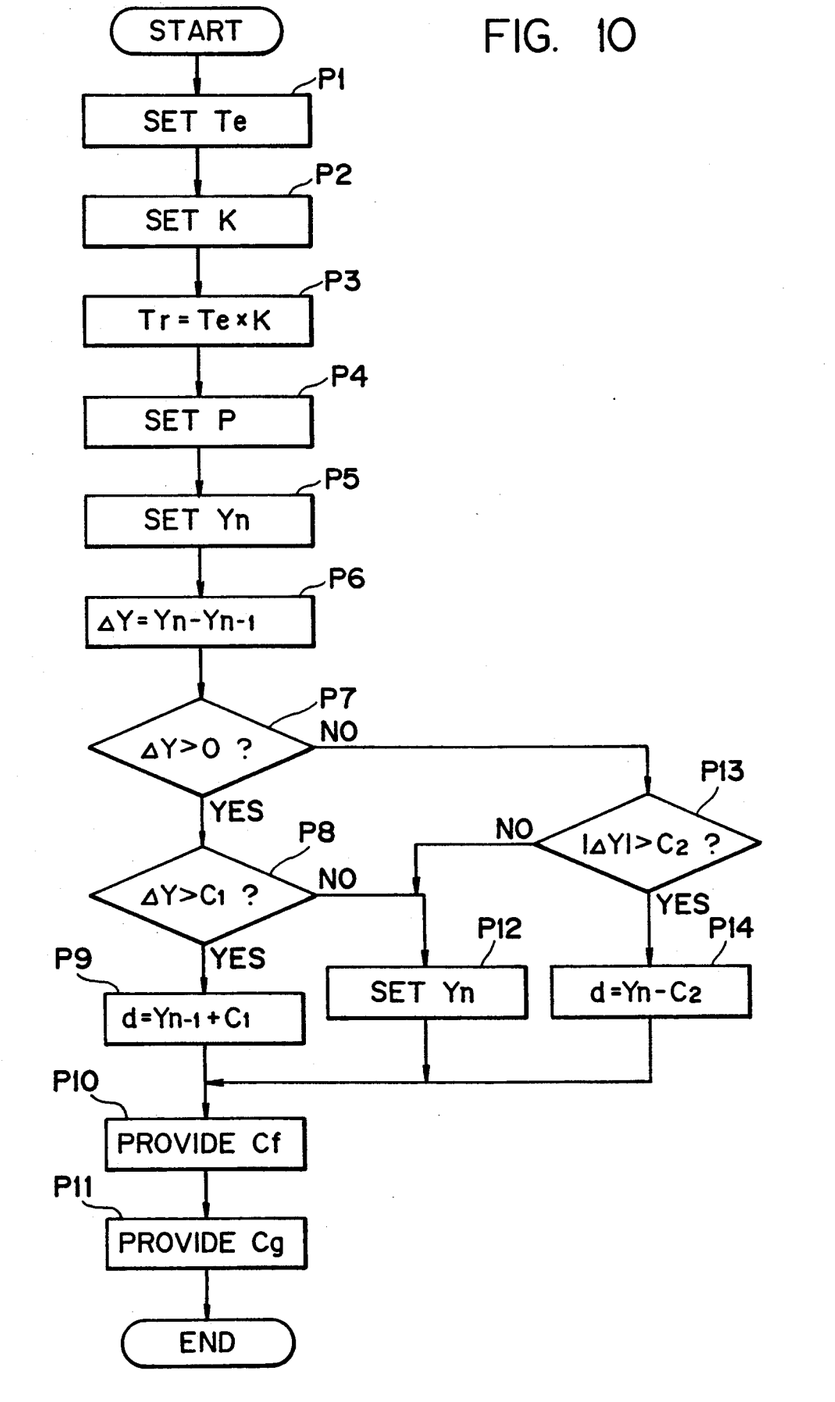

Referring now to FIG. 9, which is a flow chart of the main or general sequence routine for the microcomputer MC of the control unit 100, after reading outputs St, Sv, Ss, Sn, Sm, Sa, Su and Sb of the sensors 81-88, respectively, a decision is made in step S2 whether or not an vehicle operating condition is in the ordinary slip control (OCS) range. If the answer to the decision is yes, another decision is made in step S3 whether or not the transmission gear 26 is now shifting. If the answer to the decision in step S3 is no, a decision is made in step S4 whether or not the operating condition is in the lockup range. If the answer to the decision in step S4 is no, an ordinary slip control (OSC) subroutine shown in FIG. 10 is called for.

Figure 11:
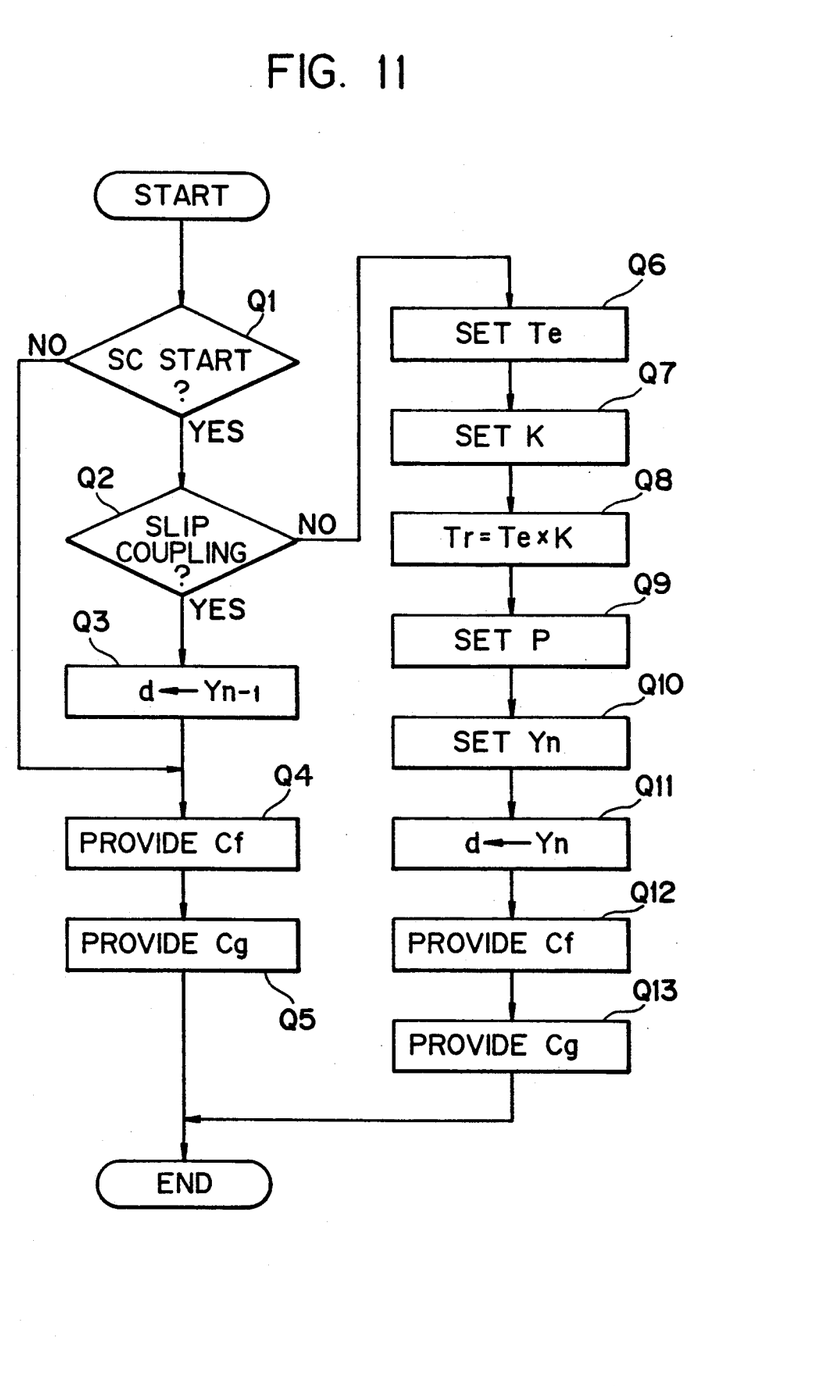
FIG. 11 is a flow chart illustrating a shift slip control subroutine for the microcomputer.

If the answer to the decision in step S3 is yes, indicating the automatic transmission 20 is shifting, a decision is made in step S6 whether or not the automatic transmission 26 upshifts. If the answer to the decision in step S6 is yes, a shift slip control (SSC) subroutine shown in FIG. 11 is called for.

Whereas, if the answer to the first decision regarding the ordinary slip control (OSC) condition in step S8 is no, a decision is made in step S8 whether or not the operating condition is in the deceleration slip control (DSC) range. If the answer to the decision in step S8 is no, a decision is made in step S9 whether or not the automatic transmission 26 is now shifting. If the answer to the decision in step S9 is no, a decision is made in step S10 whether or not the operating condition is in the lockup control (LC) range. If the answer to the decision in step S6 is no, the microcomputer MC of the control unit 100 interrupts control signals Cf and Cg to the lockup control solenoid valve 6 and the regulator solenoid valve 7 in steps S11 and S12, respectively, and then orders return to the first step of the main routine.

On the other hand, if the answer to the decision in step S10 is yes, indicating the vehicle operating condition is in the lockup control (LC) range, the microcomputer MC of the control unit 100, after providing the lockup control solenoid valve 6 with a control signal Cf in step S13, interrupts a control signal Cg to the regulator solenoid valve 7 in step S14 and then orders return to then orders return to the first step of the main routine. Steps S13 and S14 are taken also if the answer to the decision in step S4 which is the same as made in step S10 is yes. If the answer to the decision in step S9 regarding shifting of the automatic transmission 26 is yes, then, the decision in step S6 is made again so as either to call for the shift slip control (SSC) subroutine in step S7, or to take steps S11 and S12.

Figure 12:
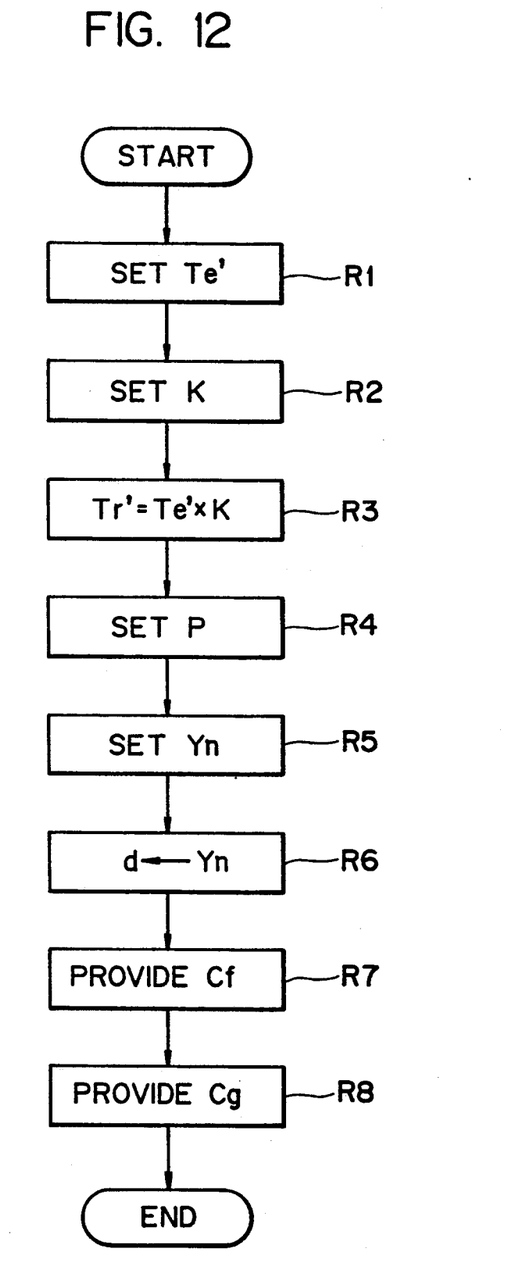
FIG. 12 a flow chart illustrating a deceleration slip control subroutine the microcomputer.

Whereas, if the answer to the decision in step S8 is yes, indicating the vehicle operating condition is in the deceleration slip control (DSC) range, a decision is made in step S15 whether or not a brake pedal (BP) is depressed. If in fact the brake pedal is depressed, after shifting the 4-3 downshifting control line Uf to a high speed side, the microcomputer MC makes a decision in step S17 whether or not the automatic transmission 26 is shifting. The decision in step S17 is also made without following the execution of shifting the 4-3 downshifting control line Uf in step S16 if the answer to the decision in step S15 is no. If the answer to the decision in step S17 is no, a deceleration slip control (DSC) subroutine shown in FIG. 12 is called for. On the other hand, the answer to the decision in step S17 is yes, indicating the automatic transmission 26 is now shifting, a decision is made in step S18 whether or not the automatic transmission 26 is downshifting into third range from fourth range. If the answer to the decision in step S18 is yes, the shift slip control (SSC) subroutine shown in FIG. 11 is called for. Otherwise, the microcomputer MC of the control unit 100 orders return to step S6 so as to make the decision whether or not the automatic transmission 26 is upshifting into high range.

Referring to FIG. 10, which is a flow chart of the ordinary slip control (OSC) subroutine, after having drawn an engine output torque Te from the engine control torque curves a1-a6 in accordance with the operating throttle opening (Th) of the throttle valve 14 and the operating engine speed (Ne) and setting a correction coefficient K in accordance with the working temperature of oil represented by a temperature signal Su in steps P1 and P2, respectively, in order, a transmissive torque Tr is determined by multiplying the engine output torque Te by the correction coefficient K in step P3. Thereafter, the microcomputer MC determines and sets a pressure difference $\Delta P$ which produces a difference of speed of rotation $\Delta N$ in accordance with the transmissive torque Tr determined in step P3 and a duty ratio $y_n$ (n is a positive integer) sufficient to produce the pressure difference $\Delta P$ in steps P4 and P5, respectively, in order. After determining a duty ratio difference $\Delta Y$ of the duty ratio $y_n$ from a previously set duty ratio $y_{n-1}$ in step P6, a decision is made in step P7 whether or not the duty ratio difference $\Delta Y$ is positive. If the answer to the decision is yes, indicating the duty ratio difference $\Delta Y$ is positive, another decision is made in step P8 whether or not the duty ratio difference $\Delta Y$ is larger than a predetermined upper limit value $C_1$. If the answer to the decision is yes, the microcomputer MC calculates an update duty ratio d from $y_{n-1} + C_1$ and sets it in step P9, and then, provides the lockup control solenoid valve 6 with a control signal Cf in step P10 and the regulator solenoid valve 7 with a control signal Cg having the duty ratio d in step P11 in order.

If the answer to the decision in step P8 is no, indicating the duty ratio difference $\Delta Y$ is equal to or smaller than the predetermined upper limit value $C_1$, then, steps P10 and P11 are taken after setting an update duty ratio d to the duty $y_n$ determined in step P5.

Whereas, if the answer to the decision in step P7 is no indicating the duty ratio difference $\Delta Y$ is zero (0) or negative, then, another decision is made in step P13 whether the absolute value of the duty ratio difference $\Delta Y$ is larger than a predetermined lower limit value $C_2$. If the absolute value of the duty ratio difference $\Delta Y$ is equal to or smaller than the predetermined lower limit value $C_2$, steps P10 and P11 are taken after setting an update duty ratio d to the duty ratio $y_n$ determined in step P5. On the other hand, if the absolute value of the duty ratio difference $\Delta Y$ is equal to or smaller than the predetermined lower limit value $C_2$, steps P10 and P11 are taken after calculating an update duty ratio d from $y_{n-1} - C_2$ and setting it in step P14. In any event, the final step orders return to the main routine.

Referring to FIG. 11, which is a flow chart of the shift slip control (SSC) subroutine, the first step Q1 in FIG. 11 is to make a decision whether or not shift control of the automatic transmission 26 should be started. If the answer to the decision is yes, another decision is made in step Q2 whether the lockup clutch is in slip coupling. The answer to the decision in step Q2 is yes, after setting in step Q3 an update duty ratio d to a duty ratio $y_{n-1}$ having been determined previously, the microcomputer MC provides the lockup control solenoid valve 6 with a control signal Cf in step Q4 and the regulator solenoid valve 7 with a control signal Cg having the duty ratio d in step Q5 in order. If the answer to the first decision in step Q1 is no, the microcomputer MC takes directly steps Q4 and 5.

Whereas, if the answer to the another decision in step Q2 is no, indicating the lockup clutch 22 is out of slip coupling, or locks or releases the torque converter 24, the microcomputer MC, after executing steps Q6–Q10 which are similar to steps P1-P5 of the ordinary slip control subroutine shown in FIG. 10, sets an update duty ratio d to the duty ratio $y_n$ in step Q11. Thereafter, the microcomputer MC provides the lockup control solenoid valve 6 with a control signal Cf in step Q12 and the regulator solenoid valve 7 with a control signal Cg having the update duty ratio d in step Q13 in order. The final step orders return to the main routine. It is noted that, although setting the pressure difference ΔP in step Q9 of the shift slip control (SSC) subroutine is effected in the same manner as in step P4 of the ordinary slip control (OSC). subroutine shown in FIG. 10, a value to which the pressure difference ΔP is set in step Q9 of the shift slip control (SSC) subroutine is smaller than that set in step P4 of the ordinary slip control (OSC) subroutine.

Referring to FIG. 12, which is a flow chart of the deceleration slip control (DSC) subroutine, after having drawn an drag torque Te' from the drag torque curves in accordance with the operating speed of rotation (Ne) of the engine 10 and setting a correction coefficient K in accordance with the working temperature of oil in steps R1 and R2, respectively, in order, a transmissive torque Tr' is determined by multiplying the drag torque Te' by the correction coefficient K in step R3. Thereafter, the microcomputer MC determines and sets a pressure difference ΔP in accordance with the drag torque Tr' determined in step R 3 and a duty ratio $y_n$ (n is a positive integer) sufficient to produce the pressure difference ΔP in steps R4 and R5, respectively, in order. After the determination of the duty ratio $y_n$, an update duty ratio d is set to the duty ratio $y_n$ in step R6. Then, the control unit 100 provides the lockup control solenoid valve 6 with a control signal Cf in step R7 and the regulator solenoid valve 7 with a control signal Cg having the update duty ratio d in step R8 in order. The final step orders return to the main routine.

Figure 13:
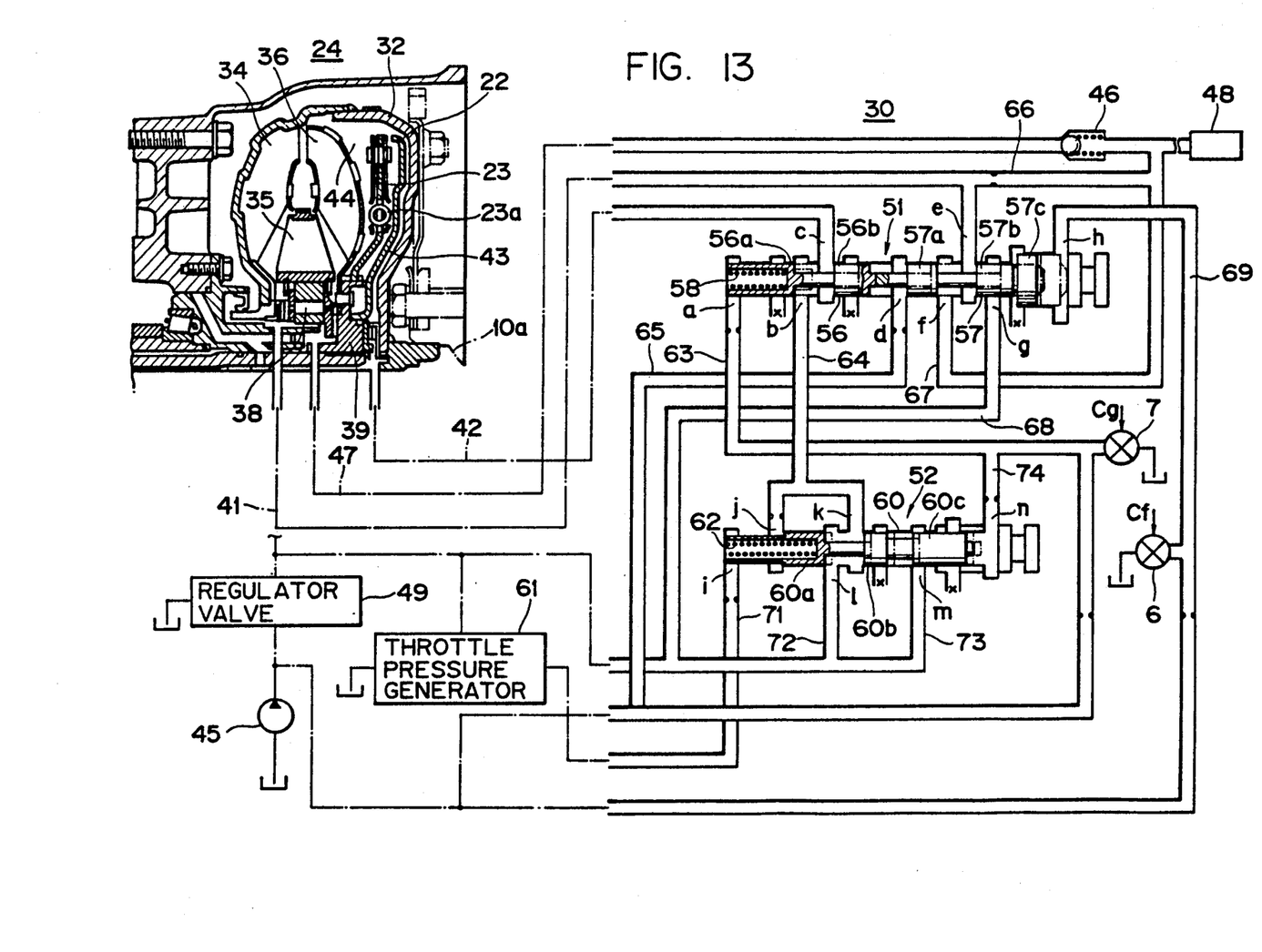
FIG. 13 hydraulic control circuit in accordance with another preferred embodiment of the present invention for controlling the power plant having an automatic transmission with a lockup torque converter shown in FIG. 1.

Referring to FIG. 13, a slip controlling system for a lockup torque converter in accordance with an alternate embodiment of the present invention is shown. This lockup torque converter differs in structure from but is practically the same in operation as that of the previous embodiment. That is, in the lockup torque converter shown in FIG. 13, a constant pressure generator is eliminated between the oil pump 45 and the passages 63 and 65. The slip control system, even having no constant pressure generator, does not causes such pressure pulsations or pressure fluctuations that practically adversely affect on the torque converter 24.

It should be noted that various changes and modifications are apparent to those skilled in the art which are within the scope of the invention, and such changes and modifications are intended to be covered by the following claims.

What is claimed is:

1. A slip control system for a lockup torque converter of an automatic transmission for an automotive vehicle having an engine, said lockup torque convertor consisting of a torque input element operatively connected to said engine, a torque output element operatively connected to said automatic transmission, and a lockup clutch for selectively coupling said torque input element and said torque output element of said lockup torque convertor, said slip control system comprising:
   a shift operation detecting means for detecting shifting of said automatic transmission;
   a deceleration detecting means for detecting that said automotive vehicle is decelerating in a predetermined speed region;
   a hydraulic pressure supply system for supplying hydraulic pressure to said lockup torque convertor so as to actuate said lockup clutch to selectively couple said torque input element and said torque output element of said lockup torque converter; and
   a hydraulic pressure control means disposed in said hydraulic pressure supply system for varying said hydraulic pressure to provide at least two different slippage states of said lockup torque converter differentiating a first slipping stage when said deceleration detecting means detects deceleration of said automotive vehicle from a second slipping state when the deceleration detecting means detects no deceleration of said automotive vehicle in a condition where said shift operation detecting means detects a specified shifting of said automatic transmission, whereby allowing said lockup torque converter to differently slip dependent on deceleration of the vehicle.

2. A slip control system as defined in claim 1, wherein said specified shifting of said automatic transmission is a specified downshifting.

3. A slip control system as defined in claim 2, wherein said specified downshifting of said automatic transmission is a fourth-to-third downshifting.

4. A slip control system as defined in claim 2, wherein said hydraulic pressure control means consists of a hydraulic pressure regulating solenoid valve which operates at different duty ratios so as to vary said hydraulic pressure.

5. A slip control system for a lockup torque converter of an automatic transmission for an automotive vehicle having an engine, said lockup torque convertor consisting of a torque input element operatively connected to said engine, a torque output element operatively connected to said automatic transmission, and a lockup clutch for selectively coupling said torque input element and said torque output element of said lockup torque convertor, said lockup clutch being disposed between first and second pressure chambers formed in a housing of said lockup torque converter, said slip control system comprising:
   an operating condition detecting means for detecting said automotive vehicle operates in any one of a first range of operating conditions where said lockup clutch allows said lockup torque converter to produce slippages, a second range of operating conditions where said automatic transmission upshifts itself, and a third range of operating conditions where said engine decelerates while operating at speeds of rotation higher than a predetermined speed of rotation;
   a shift operation detecting means for detecting shifting of said automatic transmission;
   a hydraulic pressure supply system for supplying hydraulic pressure into said first pressure chamber and withdrawing a hydraulic pressure from said second pressure chamber so as to actuate said lockup clutch to lock said lockup torque converter and for withdrawing a hydraulic pressure from said first pressure chamber and supplying a hydraulic pressure into said second pressure chamber so as to release said lockup clutch to unlock said lockup torque converter; and a hydraulic pressure control means disposed in said hydraulic pressure supply system for developing a difference between hydraulic pressures in said first and second pressure chambers when said shift operation detecting means detects shifting of said automatic transmission, thereby generating a plurality of different slippage states of said lockup torque converter so as to allow said lockup torque converter to slip in accordance with said first to third ranges of conditions.

6. A slip control system as defined in claim 5, wherein said specified shifting of said automatic transmission is a specified downshifting.

7. A slip control system as defined in claim 5, wherein said specified downshifting of said automatic transmission is a fourth-to-third downshifting.

8. A slip control system as defined in claim 5, wherein said hydraulic pressure control means consists of a hydraulic pressure regulating solenoid valve which is operated on a duty ratio so as to produce said difference of hydraulic pressure.

9. A slip control system as defined in claim 8, wherein said duty is said first range of operating conditions is changed to a value equivalent to the sum of a previously set duty and a predetermined upper limit duty when a difference of said duty from said previously set duty is larger than said predetermined upper limit duty value or a value equivalent to a difference of said duty from a predetermined lower limit duty when the absolute value of said difference of said duty from said previously set duty is larger than said predetermined lower limit duty.

10. A slip control system as defined in 9, wherein said difference of hydraulic pressure is determined to cause said lockup torque converter to produce a speed difference of rotation between an impeller and a turbine thereof sufficient to transmit of a torque which is substantially the same as an output torque from said engine.

11. A slip control system as defined in claim 10, wherein said torque to be transmitted by said lockup torque converter is said output torque multiplied by a correction coefficient.

12. A slip control system as defined in claim 11, wherein said correction coefficient varies in accordance with temperatures of an operating fluid in said hydraulic pressure supplying system.

13. A slip control system as defined in claim 12, wherein said correction coefficient is equal to one (1) at a predetermined temperature of an operating fluid in said hydraulic pressure supplying system, a value larger than one (1) at temperatures of said operating fluid higher than said predetermined temperature, or a value smaller than one (1) at temperatures of said operating fluid lower than said predetermined temperature.

14. A slip control system as defined in claim 13, wherein said predetermined temperature of said operating fluid is 90° C.

15. A slip control system as defined in claim 8, wherein said duty in said second range of operating conditions is changed to a previously set duty when said lockup clutch has been caused to allow said lockup torque converter to slip.

16. A slip control system as defined in claim 8, wherein said torque to be transmitted by said lockup torque converter is torque multiplied by a correction coefficient.

17. A slip control system as defined in claim 16, wherein said correction coefficient varies in accordance with temperatures of an operating fluid in said hydraulic pressure supplying system.

18. A slip control system as defined in claim 17, wherein said correction coefficient is equal to one (1) at a predetermined temperature of an operating fluid in said hydraulic pressure supplying system, a value larger than one (1) at temperatures of said operating fluid higher than said predetermined temperature, or a value smaller than one (1) at temperatures of said operating fluid lower than said predetermined temperature.

19. A slip control system as defined in claim 18, wherein said predetermined temperature of said operating fluid is 90° C.

20. A slip control system as defined in claim 8, wherein said torque to be transmitted by said lockup torque converter in said third range of operating conditions is a torque transmitted to said engine from vehicle wheels of said automotive vehicle which is experimentally determined.

21. A slip control system as defined in claim 20, wherein said correction coefficient varies in accordance with temperatures of an operating fluid in said hydraulic pressure supplying system.

22. A slip control system as defined in claim 21, wherein said correction coefficient is equal to one (1) at a predetermined temperature of an operating fluid in said hydraulic pressure supplying system, a value larger than one (1) at temperatures of said operating fluid higher than said predetermined temperature, or a value smaller than one (1) at temperatures of said operating fluid lower than said predetermined temperature.

23. A slip control system as defined in claim 22, wherein said predetermined temperature of said operating fluid is 90° C.

* * * * *